# (12) United States Patent
Zhao

(10) Patent No.: US 7,411,080 B2
(45) Date of Patent: Aug. 12, 2008

(54) DIRECT SYNTHESIS OF COPPER CARBONATE

(75) Inventor: Gang Zhao, Sumter, SC (US)

(73) Assignee: Phibro-Tech, Inc., Ridgefield Park, NJ (US)

( * ) Notice: Subject to any disclaimer, the term of this patent is extended or adjusted under 35 U.S.C. 154(b) by 267 days.

(21) Appl. No.: 11/436,528

(22) Filed: May 19, 2006

(65) Prior Publication Data

US 2007/0269362 A1    Nov. 22, 2007

(51) Int. Cl.
*C07F 1/08*   (2006.01)
*C01B 21/06*  (2006.01)
*C01B 31/30*  (2006.01)

(52) U.S. Cl. .................................................. 556/114
(58) Field of Classification Search ............... 556/114; 423/352, 409, 420.2, 517
See application file for complete search history.

(56) References Cited

U.S. PATENT DOCUMENTS

| | | | |
|---|---|---|---|
| 2,536,096 A | 1/1951 | Rowe | 23/147 |
| 2,536,097 A * | 1/1951 | Percy | 423/517 |
| 3,635,668 A | 1/1972 | Barker | 23/147 |
| 4,490,337 A | 12/1984 | Richardson | 423/43 |
| 4,944,935 A | 7/1990 | Langner et al. | 423/604 |
| 6,596,246 B2 * | 7/2003 | Huato et al. | 423/42 |
| 2004/0191143 A1 * | 9/2004 | Richardson et al. | 423/32 |

* cited by examiner

*Primary Examiner*—P. Nazario Gonzalez
(74) *Attorney, Agent, or Firm*—Christopher G. Hayden; Hayden Stone PLLC.

(57) ABSTRACT

A basic copper salt selected from basic copper carbonate, basic copper sulfate, basic copper acetate, basic copper citrate, and basic copper nitrate is manufactured by contacting copper metal with an aqueous solution having ammonia; an acid selected from carbonic acid, sulfuric acid, acetic acid, nitric acid, or citric acid; and oxygen, under conditions where the copper metal is converted to the basic copper salt; and then recovering the basic copper salt. The most economical embodiment is where the ammonia is present in the aqueous solution is in an amount between about 6.7 g/l and about 15 g/l calculated as $NH_3$, and the pH of the composition is between 8 and 10, and the temperature of the composition is between 25° C. and 100° C. The method is particularly useful if the basic copper salt is basic copper carbonate. The basic copper carbonate produced has the formula: $(CuCO_3)_x(Cu(OH)_2)_y$, where y is 1 and x is between 0.1 to less than 1; or where y is 1 and x is 1, or where y is 1 and x is between 0.5 to less than about 0.95, or where y is 1 and x greater than 1.

24 Claims, No Drawings

DIRECT SYNTHESIS OF COPPER CARBONATE

CROSS-REFERENCE TO RELATED APPLICATIONS

None

STATEMENT REGARDING FEDERALLY SPONSORED RESEARCH OR DEVELOPMENT

N/A.

INCORPORATION-BY-REFERENCE OF MATERIAL SUBMITTED ON A COMPACT DISC

N/A.

SEQUENCE LISTING

N/A.

FIELD OF THE INVENTION

The present invention relates to the direct formation of basic copper salts such as basic copper carbonate, basic copper sulfate, basic copper acetate, and basic copper nitrate.

BACKGROUND OF THE INVENTION

Scrap and recycled copper metal is a plentiful and inexpensive form of copper. While some of this metal is simply smelted to form copper stock, another valuable use of this copper is the production of copper salts. Copper salts, of varying purity, are used as a supplement in animal feed, are used in fungicides, are used as pigments, and are used in a variety of other chemical processes.

It is known to produce copper hydroxide in a two-stage process from a previously produced copper salt, such as copper sulfate, copper carbonate or copper oxychloride, in a process in which alkali are added to effect a precipitation of copper hydroxide at a temperature below 20° C., as described in for example U.S. Pat. Nos. 3,635,668 and 4,490,337. There are also known methods of forming copper hydroxide directly from scrap metal. U.S. Pat. No. 2,536,096 discloses a single-stage process in which copper hydroxide is produced directly from scrap copper in a solution of ammonia in concentrations in excess of 10 g/l of soluble ammonium and preferably in excess of 30 g/l. U.S. Pat. No. 4,944,935 describes a process wherein copper metal is treated at a temperature of 0° to 40° with an aqueous solution which contains 0.1 to 10 g/l ammonium salt or ammonium hydroxide (calculated as $NH_3$) with stirring and with a simultaneous introduction of an oxygen-containing gas, and the particulate copper (II) hydroxide reaction product is separated from the copper metal. This patent suggests using in the dissolution material 0 to 5 g/l copper (II) salt to make the reaction uniform.

Basic copper chloride (copper oxychloride) can be formed by treating copper carbonate with hydrochloric acid. The production of basic copper chloride via a reaction of copper metal and a chlorine source is known. Basic copper chloride may be manufactured either by the action of hydrochloric acid on copper metal or by the air oxidation of cuprous chloride suspensions.

However, to make other basic copper salts, heretofore the method of production has been to mix a first soluble copper salt with a second salt, under conditions where the copper ions from the first salt and the anions from the second salt form a precipitate. This is extremely inefficient. First, the copper metal must be converted into a soluble salt, which is typically copper chloride, copper nitrate, or copper sulfate. Second, the mixture of the two salts in water results in a large amount of waste brine (with residual copper) which must be treated prior to disposal. Third, the resulting copper salt invariably has a large amount of contamination from the anions and/or cations present in the two salts.

Basic copper carbonate ($Cu_2(OH)_2CO_3$) (hereafter "BCC") is used in a variety of applications, for example in pigments, pyrotechnics, insecticides, fungicides, astringents, and even as a feed additive. The traditional route to producing BCC is by adding sodium carbonate to a solution of copper sulfate, followed by filtering, washing, and drying. There are two inefficiencies in this method. First, copper sulfate must be prepared from copper metal or from other sources, and second, the washing of the solution in an attempt to remove the residual sulfates is expensive and produces a considerable amount of waste water requiring treatment before disposal. The formula for basic copper carbonate can be represented as $CuCO_3$—$Cu(OH)_2$, and while the theoretical amount of copper in basic copper carbonate is 57.48%, under manufacturing methods used today 56.0% is as high as conventionally practical. Generally, basic copper carbonate manufactured by this method has a high sodium content and a high sulfate content that can not be readily reduced by simple washing.

There are a number of other basic copper salts that are useful. Basic copper acetate is used as a pigment, insecticide, fungicide, mildew preventative, and as a mordant in dyeing. The chemical formula for basic copper acetate include blue verdigris, $Cu(CH_3COO)_2.Cu(OH)_2$.and green verdigris, $2Cu(CH_3COO)_2.Cu(OH)_2$. Note that in formulas provided herein waters of hydration are typically not included. Basic copper sulfate ($CuSO_4$-$3Cu(OH)_2$) is also extensively used in industry, as a fungicide, and as a micronutrient for plants. Basic copper nitrate is also useful. Commercial preparation of these materials in each case requires the reaction of two dissolved salts to form the relatively insoluble product, and as a result there are costs associated with manufacturing the reactant salts and in removing contaminants.

What is needed is a method of directly forming a variety of basic copper salts from copper metal.

SUMMARY OF THE INVENTION

In a broad aspect the invention encompasses a novel method of synthesizing selected basic copper salts including basic copper carbonate, basic copper sulfate, and basic copper acetate directly from copper metal using water, an amine (preferably ammonia), an oxidizing source (preferably oxygen), and a source of anions. Advantageously the reaction takes place in a single reactor. Advantageously the oxidant is a gas comprising oxygen, such as oxygen, an oxygen/inert gas mixture such as oxygen and nitrogen, air, or any combination thereof. The reaction process can be a batch process or a continuous process. For a batch process, the reaction is continued until the desired conversion of copper to basic copper salt is achieved. For continuous processes, advantageously the liquid in the reaction vessel is circulated with sufficient velocity to carry the basic copper salt particles as a slurry, and this slurry is cycled to a separation unit (such as a filter, a centrifugal separator, or a settling tank) where the particles of basic copper salt are recovered. For the manufacture of basic copper sulfate, the preferred sources of sulfate are ammonium sulfate and/or sulfuric acid. Acid is more preferred over the ammonium salts. The anion source should contain sufficient acidity (sulfuric acid as opposed to ammonium sulfate) to control the pH to the desired set point, where the degree of incorporation of the anion into the basic copper salt depends on this pH set point. Using only ammonium sulfate would provide an undesirable excess of ammonia in the composition, and the pH would be such that very little if any of the anion would be incorporated into the salt. For basic copper carbonate the preferred anion source is carbon dioxide, which must be added in an amount substantially greater than the trivial amount present in air. For basic copper acetate, the preferred anion source is acetic acid and/or ammonium acetate. For basic copper nitrate, the preferred anion source is nitric acid and/or ammonium nitrate. The reaction contents must be well mixed to allow the oxygen to react with copper at favorable reaction rates.

In a preferred embodiment the invention encompasses a method of synthesizing basic copper carbonate directly from copper metal using water, ammonia, air and carbon dioxide. By this process we are able to effect partial to complete conversion from metal powder to basic copper carbonate with high purity and variable particle size, including advantageously an embodiment producing relatively large median particle size basic copper carbonate. The process represents a significant cost advantage over the traditional route of BCC precipitation via the reaction of copper sulfate with sodium carbonate because it eliminates the intermediate step of copper sulfate preparation (from metal or other sources) as well as the washing step to remove some of the sodium and sulfate contaminants.

In other preferred embodiments basic copper sulfate is produced utilizing the same process, but replacing carbonate with a source of sulfate. In another preferred embodiment basic copper nitrate is produced utilizing the same process, but replacing carbonate with a source of nitrate. In another preferred embodiment basic copper acetate is produced utilizing the same process, but replacing carbonate with a source of acetate. In another preferred embodiment basic copper citrate is produced utilizing the same process, but replacing carbonate with a source of citrate. In another preferred embodiment basic copper borate is produced utilizing the same process, but replacing carbonate with a source of borate. In each case, the product can be made to hold a sub-stoichiometric amount of the carbonate, nitrate, sulfate, acetate, citrate or borate. These products appear stable under heat, unlike copper hydroxide. Further, in each case, the excess copper hydroxide can be readily converted to the stoichiometric basic copper salt by addition of a sufficient amount of the appropriate anions at the conclusion of the reaction. Furthermore, in each case, the excess copper hydroxide can be readily converted to the stoichiometric copper salt in other forms (such as copper sulfate mono-hydrate or pentahydrate) by blending a sufficient amount of the appropriate anions to the filtered copper hydroxide or BCC.

DETAILED DESCRIPTION OF PREFERRED EMBODIMENTS

Described herein is a novel method of synthesizing basic copper carbonate (BCC) or other basic copper salts directly from copper metal and carbon dioxide (or other acids instead of $CO_2$). By this process we are able to effect the complete conversion from metal to a basic copper carbonate (BCC) or other basic copper salt. The process represents a significant cost advantage over the traditional route of BCC precipitation via the reaction of copper sulfate with sodium carbonate because it eliminates the intermediate step of copper sulfate preparation (from metal or other sources), the cost of soda ash as well as the washing step to remove the sodium sulfate by-product.

The invention includes a method of forming basic copper salt selected from basic copper carbonate, basic copper sulfate, basic copper acetate, and basic copper nitrate, the method comprising: contacting copper metal with an aqueous solution comprising: an amine; an acid selected from carbonic acid, sulfuric acid, acetic acid, nitric acid, or boric acid; and oxygen, under conditions where the copper metal is converted to the basic copper salt; and recovering the basic copper salt. Advantageously the amine is ammonia. Advantageously the amount of copper metal is such that there is at least one mole of copper for every two moles of ammonia, for example at least 1.2 moles of copper metal for every mole of ammonia, especially for to open reactors only). Advantageously the ammonia is present in the aqueous solution in an amount between about 6.7 g/l and about 15 g/l calculated as $NH_3$, preferably between about 8 g/l and about 13 g/l calculated as $NH_3$. Advantageously the pH of the composition is between 8 and 10, and the temperature of the composition is between 25° C. and 100° C. The method is particularly useful if the basic copper salt is basic copper carbonate. The basic copper carbonate produced has the formula: $(CuCO_3)_x \cdot (Cu(OH)_2)_y$, where y is 1 and x is between 0.1 to less than 1; or where y is 1 and x is 1, or where y is 1 and x is between 0.5 to less than about 0.95, or where y is 1 and x greater than 1. The composition of the product can be dictated by the pH of the reaction composition, and can be changed at the conclusion of the reaction by changing the pH of the reaction composition and allowing sufficient time for the product to convert to a different product. The method is useful when the basic copper salt is basic copper sulfate. The basic copper sulfate has the formula: $(CuSO_4)_x \cdot (Cu(OH)_2)_y$, where y is 3 and x is between 0.1 to less than 1, or where y is 3 and x is 1, or where y is 3 and x is greater than 1. The method is useful when the basic copper salt is basic copper nitrate. The basic copper nitrate has the formula: $(Cu(NO_3)_2)_x \cdot (Cu(OH)_2)_y$, where y is 3 and x is between 0.1 to less than 1, or where y is 3 and x is 1, or where y is 3 and x is greater than 1. The method is useful when the basic copper salt is basic copper acetate. The basic copper acetate has the formula: $(Cu(CH_3COO)_2)_x \cdot (Cu(OH)_2)_y$, where y is 1 and x is between 0.1 to less than 1, or where y is 1 and x is 1, or where y is 1 and x is between 1 and 2, or where y is 1 and x is 2, or where y is 1 and x is greater than 2. Advantageously the process is a batch process. Advantageously the aqueous solution at the beginning of the reaction further comprises between 0.1 to 15 grams of soluble copper ions per liter of soluble copper.

In an alternative embodiment the invention encompasses a method of forming basic copper salt selected from basic copper carbonate, basic copper sulfate, basic copper acetate, and basic copper nitrate, the method comprising: contacting copper (II) hydroxide with an aqueous solution comprising an amine and a sufficient amount of an acid selected from carbonic acid, sulfuric acid, acetic acid, nitric acid, or boric acid to convert at least one fourth of the copper hydroxide to the basic copper salt; under conditions where the copper hydroxide is converted to the basic copper salt; and recovering the basic copper salt. Advantageously the amine is ammonium hydroxide. Advantageously the copper hydroxide is formed by contacting copper metal with an oxidant and an aqueous solution comprising ammonium hydroxide under conditions that the copper metal is converted to copper hydroxide.

The preferred invention is method of making basic copper salt directly from copper metal and an organic or inorganic acid. Alternatively but less preferably, the invention is making basic copper salt directly from copper hydroxide and an organic or inorganic acid. The basic copper salt has the following general formula: $(Cu\text{-}An)_x.(Cu(OH)_2)_y$, where An is a sufficient amount of the anion to provide a charge of minus 2, and x and y are (in the prior art) integers representing stoichiometric ratios that are known for the various basic copper salts. For basic copper carbonate, x and y are both 1. For basic copper sulfate, x is 1 and y is 3. For basic copper nitrate, x is 1 and y is 3. For blue basic copper acetate, x and y are both 1. For blue basic copper acetate, x is 2 and y is 1.

The overall reaction can be portrayed as follows:

$2Cu + \frac{1}{2}(1+x)O_2 + H_2O + xCO_2 = (CuCO_3)_x.Cu(OH)_2$
where, $x>0$ Note in the above reaction that if x is zero, this is the known process for forming copper hydroxide that was described in the background section of this disclosure. The reaction is believed to follow several discrete steps. First, there is the oxidation/dissolution of a portion of the copper in the amine (usually in an aqueous solution) and formation of copper (II) amine complex. Advantageously the amount of amine present in the reaction system is significantly less than the 3 to 4 moles of amine needed to dissolve all the copper in the reaction system. This first reaction step can be represented as follows:

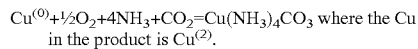
$Cu^{(0)} + \frac{1}{2}O_2 + 4NH_3 + CO_2 = Cu(NH_3)_4CO_3$ where the Cu in the product is $Cu^{(2)}$.

This reaction is predominant at the beginning of the reaction. The pH of the solution should drop as free ammonia is consumed. We have shown, in for example commonly owned U.S. Pat. Nos. 6,905,532, 6,905,531, and 6,646,147, each titled Process for the dissolution of copper metal, that the dissolution rate of copper in the early stages of the reaction are extremely slow, and a substantially faster initial rate can be obtained by having a small amount of soluble copper in the reaction composition at the beginning of the process. Without being bound by theory, we believe copper (II) ions catalyze the oxidation of copper metal by oxygen, perhaps by reacting with the copper metal to form two soluble copper (I) ions. Such a process can be shown in a simplified manner as follows:

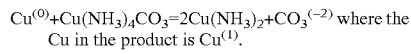
$Cu^{(0)} + Cu(NH_3)_4CO_3 = 2Cu(NH_3)_2 + CO_3^{(-2)}$ where the Cu in the product is $Cu^{(1)}$.

This is doubtless an over-simplification, but is useful in envisioning the process. The next step is the formation of basic copper (II) salts such as basic copper carbonate. We believe, without being bound by theory, that as copper (I) ions are solubilized and then oxidized, the solution becomes deficient in ammonia and therefore super-saturated with Cu(II) ions. These Cu(I) ions are solubilized with only two ammonia molecules, but are readily converted by oxygen to copper (II) ions. But once converted from Cu(I) to Cu(II), the copper atoms require four ammonia molecules to remain soluble. So two soluble $2Cu(NH_3)_2$ complexes (where Cu is Cu(I)) on oxidation form one solubilized Cu(II) ion and one $Cu(NH_3)_4CO_3$. The Cu(II) ion is then rapidly precipitated into a salt, incorporating hydroxides and/or anions as they are available to form a basic copper salt precipitate.

For any of the above-mentioned basic copper salts, the product $(Cu\text{-}An)_x.(Cu(OH)_2)_y$, can be formed where 1) x and y are stoichiometric, 2) where y is stoichiometric and x is greater than zero but is sub-stoichiometric, and 3) under some conditions a product may be formed where y is stoichiometric but x is slightly over the stoichiometric amount. We believe x can be very sub-stoichiometric, such as where x is at least greater than 10% of the stoichiometric amount, but such a salt may not be stable. More stability can be obtained if x is at least one half the stoichiometric amount, and x is probably typically at least 80% of the stoichiometric amount. Under most reaction conditions, x should not exceed the stoichiometric amount by any significant amount. Under some reaction conditions, x may exceed the stoichiometric amount, but our data on this phenomenon to date suggests this may be by only a few percent, that is, where x may be between the stoichiometric amount and say 1.03 times the stoichiometric amount. If the anion is carbonate, the recovered basic copper salt can be represented as $(CuCO_3)_x.Cu(OH)_2$, where, $x>0$, for example where x is between 0.1 and 1.1, more typically where x is between 0.5 and 1.03, and usually where x is between 0.8 and 1.

Using the process of this reaction, but with higher pressure reactors, we believe it is possible to make azurite $(Cu_3(CO_3)_2(OH)_2)$ with higher CO2 content (35% CO2 in the formula vs 20% in BCC) can be manufactured. The experimental conditions described in the examples were limited primarily by the equipment on hand, for example, our CO2 pressure was only 15-20 psi. Secondly, the final solution was saturated with ammonia carbonate, which formed a solution with a pH of always higher than 7 (strong base/week acid) and could have blocked the contact of CO2 with the BCC. We would expect a different result if we reduce the amount of ammonia and remove ammonia carbonate from the BCC and increase CO2 pressure to over 1500 psi.

Copper metal, oxygen, $CO_2$, and a trivial amount of water are consumed in the above reaction. The pH rises as the carbon dioxide is consumed. Depending on the set point of pH control, different value of x in above reaction is obtained. For basic copper carbonate, if the reaction pH or the final pH is around 7-7.5, we would expect to obtain a x value of about one in the formula above. On the other hand, if we allow pH to increase without supplying a sufficient amount of CO2, the expect product from this process should be or very close to copper hydroxide with an x value near zero. We also have preliminary experimental data to indicate an x value of more than one could be achieved in our pressurized pilot vessel with high pressure $CO_2$. This could be a new product to the market. BCC produced by conventional method always has an x value of about one.

A reactor is charged with copper metal, water, an amine to solubilize the copper metal, and an acid, salt, or gas to provide necessary anions. An oxidant is added, and the composition is agitated to form a product.

The copper can be any copper. The copper metal can be in physical shape such as chops, powder, blisters and wires, etc. Fast reaction times are obtained when the copper is in powder form, but this is not essential. Fast dissolution of copper in blister and in other forms in a copper amine system is known.

Brass is particularly difficult to dissolve using prior art methods. Also useful are less pure forms of copper such as brass and other alloys. The process of this invention may also be useful in forming mixed salts such as zinc-copper sulfate or basic zinc-copper sulfate, which can be very useful in feed mixtures. It is possible to then convert these basic salts (as wet filter cakes containing about 20% moisture) into more bio-available sulfates by mixing with more sulfuric acid in a ribbon blender. For example, blending wet BCC with sulfuric acid will convert it into feed-grade copper sulfate in a single step process. This eliminates the steps to crystallize and to dry the products.

The amine is preferably ammonia. As used here, ammonia is used synonymously with ammonium hydroxide, as the reaction will always take place in the presence of water. Other amines can be used, e.g., monoethanolamine, ethylene diamine, or the like, but such materials are at best no more effective than ammonia, and those materials cost more than ammonia. We tried to replace part or all of the ammonia with ethanolamine but did not achieve a completion of copper conversion in reasonable reaction time. However, as the high reaction rate for the $NH_3$—$CO2$ system was only achieved in a narrow operating window in open systems. Enclosed economically feasible systems where ammonia loss is not an issue, the operating window for concentration of ammonia may be significantly broader; there may be reaction conditions where other amines can be useful. Preferably at least more than half (by moles) of the amine is ammonia, and more preferably at least 90% of the moles of amine are ammonia.

It should be noted that a sufficient amount of amine such as ammonia needed to dissolve and complex copper is about 3.5 moles amine per mole of copper, but the process of this invention can proceed rapidly with much less amine. For example, in the batch reaction described in Example 1, 0.176 moles of $NH_4OH$ were used to convert 0.315 moles of copper, and there was 1.8 moles copper metal per mole of amine. The amount of amine in the water appears to be critical, but the amount of copper metal in the reaction system can conceivably be any amount. It is highly probable that increasing the ratio of copper to amine present in the reaction composition will result in larger particle sizes of the basic copper salt.

The reaction time seems to be fastest when the amount of ammonia in the water in the reaction system is close to 10 g/l, say between about 8 and about 13 g/l, preferably between about 9 and about 12 g/l, for example between about 10 and about 11 g/l. It is surprising that 15 g/l is not at least as effective as 10 g/l, and this might be a function of our experimental conditions and process, especially in a different (lower) pH window.

If air is used as the oxidant, ammonia will be stripped from the reaction composition by the sparging gas, as nitrogen is inert and must be removed from the reaction vessel. It may be that reducing the amount of ammonia in the water during the later stages of the process will result in larger basic copper salt particles, as the more dilute system should favor growth of existing particles over formation of new particles. Similarly, we can implant a step to remove ammonia from the closed systems to achieve a similar result (by vacuum?) It may be useful to reduce the amount of ammonia in the water in the reaction system during the later stages of the reaction (i.e., when more than half of the copper metal has been dissolved) to between one third and 90%, for example between about 40% to 75%, of the initial ammonia concentration. If the system is closed and ammonia is not being lost to air sparging, this may only be achievable by adding water to the reaction composition.

Although the reaction can be performed at room temperature or lower, it is advantageous to raise the reaction temperature to get a better conversion rate. The reaction can be conducted at temperatures as high as the solution boiling point at either atmospheric pressure or in a closed (pressurized) system. However, particle size seems to be at least somewhat related to reaction time, and very short reaction times such as are obtainable at temperatures of for example 60° C. to 100° C. give small particles, e.g., particles in a range of 1 to 9 microns. At temperature of room temperature, the reaction takes ~20 or more hours to complete (where there is 1.8 moles of copper per mole of ammonia). It seems the best reaction rate, if a product having a size greater than 10 microns is desired, is between about 30° C. to about 55° C., say from 35° C. to about 50° C.

The reaction can be run at atmospheric pressure or at super-atmospheric pressure. At super-atmospheric pressure, say from 1.1 to 20 atmospheres but more typically from 1.1 to 8 atmospheres, the gas reactants can be more efficiently provided to the reaction composition. It may also be possible under superatmospheric carbon dioxide pressure to for a basic copper carbonate salt having a greater than stoichiometric amount of carbonate. The reaction can also proceed at subatmospheric pressure, but there seems to be no incentive and several disincentives to operating at less than ambient (atmospheric) pressure.

In cases where we discuss the effect of carbon dioxide, similar effects (pH control and providing the required anions) are obtained with sulfuric acid, nitric acid, acetic acid, or boric acid.

The reaction can proceed in a mixed batch reactor, in a packed column, in a continuously stirred reactor, in an advanced gas reactor (AGR), or in other suitable reactors. In any case, there should be provisions for the copper metal to be in close proximity to oxygen sources such as air bubbles. This generally requires a counter flow packed reactor, a fluidized bed reactor, or a vigorously stirred reactor.

It is advantageous to maintain a relatively high pH during the reaction to facilitate oxidation of copper metal to Cu(II). This also insures a ready supply of hydroxyl ions to form the copper hydroxide portion of the basic copper salt. We found that the set point of the pH and the concentration of ammonia or ammonia carbonate had significant impact on the rate of copper conversion of copper to basic copper carbonate at the given experimental conditions. The quickest reaction rate was achieved at a set pH of about 8.5 to about 9.5, for example about 9.0, and 10 g/L initial pH charge (in open reactor conditions).

This process may be used to make copper hydroxide if we allow a high pH set point, for example at a pH of $\geq 10.50$. In this process, blue copper hydroxide is produced by treating copper metal with an ammonium-ion-containing aqueous solution with stirring and with a simultaneous introduction of an oxygen-containing gas. The composition can therefore be run with very little acid being added, and the product will be substantially copper hydroxide. Copper hydroxide can then be converted to a basic copper salt be the addition of a sufficient amount of the acid. The ammonia in the water allows a sufficient rate of salt dissolution/reprecipitation that in a relatively short amount of time copper hydroxide, such as copper hydroxide prepared by the process of this reaction or copper hydroxide prepared in alternative ways and then introduced to the water-ammonia-acid composition, with sufficient time, temperature, and agitation, can be at least partially converted (and seems to be fully converted to the respective basic copper salt. In the absence of acid, or even in the presence of small amounts of acid, at high temperatures (e.g., greater than 75° C.), it appears that high purity grade (HPG) copper oxide can be made with the same process when the conversion is running at high temperature.

Various rate enhancing agents can be added. As previously described, soluble copper salts added to the initial reaction composition are rate enhancing agents. Other examples of rate enhancing agents include one or more of chloride ions, sulfate ions, nitrate ions, and some organic amine compounds. Ammonium chloride, ammonium sulfate, ammonium phosphate, ammonium nitrate or ammonium acetate, individually or in combination, are suitably added as the ammonium salt. It is also possible to use ammonium salts of other inorganic or organic acids, individually or in combination. Use of oxygen or oxygen-enriched gas as opposed to air can enhance the rate of reaction.

We were able to obtain the stable form of $(CuCO_3)_x \cdot Cu(OH)_2$, where x was a fraction between greater than zero and equal to or less than 1. The high $OH/CO_3$ ratio in the formula could be advantageous in various markets, for example for higher retention of copper in the wood after injection. The basic copper carbonate sold on the market always had $OH/CO3$ ratio of about one. It is also very likely we can make $(CuCO_3)_x \cdot Cu(OH)_2$ with x value of higher than one with a post high $CO_2$ pressure treatment. This could be an ideal product for the catalyst market.

EXAMPLE 1

A 500-ml beaker with magnetic stir bar was charged with about 300 ml water and 3 g of ammonia (0.176 moles of $NH_4OH$, added in the form of 10 grams of concentrated aqueous ammonium hydroxide). $CO_2$ gas was bubbled into the solution with agitation until a pH of 8.5 was obtained. The solution was heated on a hot plate and maintained at temperature of about 50° C. Approximately 20 g (0.315 moles) of copper powder (~325 mesh) was added to the beaker under good agitation. The molar ratio of copper to ammonia was 1.8, and the copper loading was 66.6 grams per liter of water. Air was introduced at the same time. During the course of the reaction the pH increased gradually, so $CO_2$ gas was occasionally introduced to maintaining a pH of around 8.5. After about 10 hrs no metallic copper was visible, and a slurry of green BCC precipitate was obtained, which held a stable pH of 8.50 without need for further $CO_2$ addition. No metallic copper was observed. The reaction mixture was filtered to yield a green solid cake and a near colorless filtrate. The cake, after drying in a 50° C. oven overnight, was found to contain 56.2% copper. The theoretical copper content of basic copper carbonate is 57.48% but commonly 56.0% is as high as conventionally practical to manufacture. The weight mean particle size ("WMPS", the diameter at which half of the weight of material is present as particles having an effective diameter which is less than the weight mean particle size) of the basic copper carbonate precipitate was 15.2 microns and the packed bulk density was 0.70 lbs/ft$^3$. The particle size was determined using a MicroTrac™ S3500/S3000 laser scattering device. The packed bulk density "PABD" was determined using a JEL Stampfvolumeter™ STAV 2003.

EXAMPLE 2

The reaction conditions were similar to these in example #1 except that the reaction temperatures and pH's were varied. Again, the molar ratio of copper to ammonia was 1.8, and the copper loading was 66.6 grams per liter of water. In Example 2, the reactant composition was held between 30° C. to 39° C. for 15 hours, and was lowered and held at 20° C. for an additional 31 hours. Carbon dioxide was added to control the pH to a value between 8.0 and 9.0. The total reaction time was 46 hours. The weight mean particle size of the basic copper carbonate was 15.5 microns, which is not substantially different than that obtained in Example 1. The $CO_2$ and air spargers occasionally were plugged by copper powder or basic copper carbonate, and the surfaces of the glass frits of the spargers were cleaned up occasionally by soaking in acid solution.

EXAMPLE 3

The reaction conditions were similar to these in example #1 except that the reaction temperatures and pH's were varied. Again, the molar ratio of copper to ammonia was 1.8, and the copper loading was 66.6 grams per liter of water. In Example 3, the reactant composition was held between 20° C. to 25° C. for 45 hours. Carbon dioxide was added to control the pH to a value between 7.5 and 9.0. The total reaction time was 45 hours. The weight mean particle size of the basic copper carbonate was 13.4 microns, which is somewhat lower than was obtained in Example 1. The $CO_2$ and air spargers occasionally were plugged by copper powder or basic copper carbonate, and the surfaces of the glass frits of the spargers were cleaned up occasionally by soaking in acid solution.

EXAMPLES 4 to 12

The reactions were conducted in a 4-liter beaker. Each reaction was charged with 3 liters of DI water and certain amount of aqueous ammonia as specified in the table below. After the initial charge of ammonia into water heals, the pH of the solution would be above 11.50. The pH of the solution was adjusted to the set point with $CO_2$ and 200-grams (3.15 moles) of the copper powder were added. For Examples 4 to 10, the initial molar ratio of copper to ammonia was again 1.8 and the copper loading was 66.6 grams per liter of water, the same ratios as in Examples 1-3. Aeration started immediately after the charge of copper powders. An agitation rate of 350 RPM was always maintained during the course of all reactions. $CO_2$ gas was introduced into the reactor through a cylindrical gas dispersion tube (Wilmad-Lab Glass p/n: LG-8680-120) and controlled by a Solenoid Valves (EW-01367-70, Cole-Parmer® Two-Way Valve; normally closed). When pH of the reaction was higher than the set point of the reaction, the pH controller opened the valve to allow $CO_2$ to bubble into the solution from the bottom of the reactor using a gas diffusion stone (VWR Cat#: 32575-007). The controller was set so that the $CO_2$ control valve shut off as soon as the pH value for the reaction was 0.02 units lower than the set point. Typically, during the initial few hours of the reaction, the pH of the composition would drop, presumably due to formation of copper (II)-ammonia complex. Then, the pH would increase gradually, presumably as a result of removal of carbon dioxide from the liquid by the conversion of the copper (II)-ammonia complex to basic copper carbonate. $CO_2$ was consumed by the reaction, and was added to maintain the set pH point during the course of the reaction. The pertinent reaction conditions, the reaction time, the weight mean particle size, the packed bulk density, and the % copper in the recovered basic copper carbonate are presented in Table 1.

TABLE 1

| Example # | pH | Temp °C. | start $NH_3$ g/L | Rx time hours | WMPS micron | end $NH_3$ g/L | PABD g/cc | % Cu in BCC |
|---|---|---|---|---|---|---|---|---|
| 4 | 8-10$^3$ | 30 | 10 | 45 | 28 | 7.6 | | |
| 5 | 9.5 | 25 | 10 | <64 | 19.5 | 3.7 | 1.01 | 55.3 |
| 6 | 8.5 | 25 | 10 | 80 | 20.6 | 3.7 | 0.81 | 55.5 |
| 7 | 8.1 | 25 | 10 | 128 | 20 | 5.8 | 0.74 | 54.4 |

TABLE 1-continued

| Example # | pH | Temp °C. | start NH$_3$ g/L | Rx time hours | WMPS micron | end NH$_3$ g/L | PABD g/cc | % Cu in BCC |
|---|---|---|---|---|---|---|---|---|
| 8 | 9.0 | 25 | 10 | 20 | 21.4 | 7.6 | 1.37 | 55.2 |
| 9 | 9.0 | 25 | 10$^6$ | 21.5 | 13.9$^4$ | 6.5 | 1.14 | ~55 |
| 10 | 9.5 | 26 | 10 | >45 | 14.7$^4$ | 3.4 | 1.14 | 50.5 |
| 11 | 9.0 | 25 | 6.7 | >>168 | N/A | N/A | N/A | N/A |
| 12 | 9.0 | 25 | 15 | 110 | 17.2 | 4.7 | 0.95 | 56.2 |

$^4$Particles size distribution showed double peaks on charts, which indicate incomplete conversion of copper metal to the carbonate.

In Example 4 no pH control was used, and pH was adjusted occasionally by hand and kept within the broad range of 8 to 10. The product had a considerably larger particle size than particles produced in Examples 2 and 3, and the only factor which may account for this is the pH control, e.i., the addition of carbon dioxide. We noticed that about 24% of the initial ammonia charge was lost during the reaction, presumably to the sparging air, though the possibility of some ammonia following the basic copper carbonate as a contaminant can not be discounted.

In Example 5 (and in Examples 6-12) the reaction temperature was held at ~25° C. At pH 9.5, the reaction time was extended from the 45 hours at 30° C. in Example 4 to less than 64 hours. The reaction may have been completed many hours earlier, but the reaction vessel was not checked for the ~12 hours before the 64 hour completion time. It is clear from the experiments that the reaction rate increases with temperature. The extended reaction time in Example 5, during which air was being sparged through the composition, not surprisingly resulted in almost two thirds of the ammonia being lost.

In Example 6, at pH 8.5, the reaction time was 80 hours. Clearly the reaction rate is much faster (~25% faster) at pH 9.5 than at pH 8.5. Again, almost two thirds of the ammonia was lost during the course of the reaction. This trend was confirmed in Example 7, wherein the pH was controlled at 8.1, and the reaction time was extended to a very unfavorable 128 hours. Reaction time can be disastrous for project economics, as the sparging and mixing require substantially continuous consumption of energy, and capital costs are higher as the production rates from a given reactor will be low. The lower pH had the side effect of retaining more of the initial ammonia charge, and only about 40% of the ammonia was lost during the course of the reaction. This does not impact economics as much as the extended reaction times.

In Example 8 the pH was controlled at 9. The reaction time was 20 hours, which is a beneficially short reaction time at this temperature. The particle size was good, that is, about 21 microns for certain applications. For other applications such as catalysts smaller particles can be useful. In Example 10 the pH was raised to 9.5, and the reaction time extended out to over 45 hours. Further, the particle size distribution showed a bimodal pattern, suggesting incomplete conversion of copper to basic copper carbonate. Of course, Example 5 showed the reaction time to be less than 64 hours. Clearly, the ideal pH is around pH 9. While the process might proceed in a composition having 10 g ammonia per liter of water at pH ranges between about pH 7.5 to some very high value, say pH 13, the preferred pH is equal to or greater than about 8.5 and less than 11, preferably equal to or greater than about 8.7 and less than or equal to about 9.5, for example between 8.8 and 9.4 or between 8.9 and 9.3.

Generally, larger particle size is preferred, to a point, as it makes separating and handing the product relatively easy. A product having a particle diameter greater than about 20 microns can be rapidly separated from the liquid by centrifugation or even by short settling times. In contrast, a particle size of 4 microns acts like clay, in that it is difficult to separate from the liquid by settling or by filtration. The product at pH 9 had a weight mean diameter of about 21 microns, which seems to be a few microns larger than the product formed a pH 8.5 and at pH 9.5.

Up to this point all the Examples had been batch reactions. To estimate the process characteristics during a continuous process, in Example 8 the spent liquid from Example 8 was refortified with ammonia and re-used in Example 9, using the same process parameters as in Example 8. The reaction was stopped at 21.5 hours, one and a half hours longer than Example 8 took to reach completion. While copper powder was not visible, the particle size distribution was bimodal, suggesting incomplete conversion. However, the copper composition was 55% which indicated that the conversion of copper metal to BCC was nearly done. Further, the mean weight particle size was 14 microns, down considerably from the 21 microns in Example 8.

The extended processing was found to result in considerable loss of ammonia over the course of the reaction. This will extends the reaction time. To determine the effect of reducing the amount of ammonia, in Example 11 the initial charge of ammonia was decreased from 10 g/l to 6.7 g/l. For Example 11, the initial molar ratio of copper to ammonia was 2.7 as opposed to the 1.8 ratio in previous Examples, and the copper loading remained at 66.6 grams per liter of water, the same ratios as in the previous Examples. At pH 9, the reaction rate was too low to use in a commercial system. The reaction proceeded but at a markedly reduced rate, and the reaction was not near completion when the test was terminated at 168 hours. Although the liquid after this test was not analyzed, it is believed that the 168 hours of sparging probably stripped most if not all of the ammonia from the liquid.

On the other hand, the data suggests that starting with higher levels of ammonia are not particularly effective (in an open reactor), at least at pH 9. In Example 12, 15 g/l of ammonia was added to the water at the start of the reaction. For Example 12, the initial molar ratio of copper to ammonia was 1.2 as opposed to the 1.8 ratio in previous Examples, and the copper loading remained at 66.6 grams per liter of water, the same ratios as in the previous Examples. At pH 9, the reaction was not complete until 110 hours, by which time the amount of ammonia present in the liquid was down to less than one third of the original charge. It appears, at 25° C. and at pH ~9, that the highest rate of conversion is achieved with about 0.4 moles/l to about 0.8 moles/l, but preferably about 0.6 moles/l of amine (e.g., 10 g/l ammonia) present in the reaction liquid. The reaction rate would very likely be beneficial to continuously or periodically add small amounts of ammonia as the reaction proceeds, to replace ammonia lost by sparging. Alternately, by adding oxidizer without a large amount of inert material (for example adding oxygen instead of air), sparging can be substantially eliminated as the oxygen will be consumed by the reaction.

Further, the inclusion of some small amount of copper, preferably equal to or less than one fourth of the concentration in moles per liter of amine, can beneficially be added to the initial reaction liquid to jumpstart the reaction and significantly shorten the reaction time. For a composition having 10 g/l ammonia in the initial charge, the amount of copper ions (as copper) should be between about 0.1 to 15 grams per liter of soluble copper, for example between about 5 and about 10 g/l.

At end of each reaction with the set pH mentioned, green-colored basic copper carbonate products were always produced. The material was typically not pure basic copper carbonate, but appeared to be a homogeneous mixture of basic copper carbonate and basic copper hydroxide, that is, $(CuCO_3)_x \cdot Cu(OH)_2$, where, x is greater than zero but is less than 1. Actually, x appears to typically range, in the experiments performed, from 0.9 to about 1, but we believe any value, for example from 0.5 to 1 and possibly even to 1.05 or so, is possible by changing reaction conditions. At the conclusion of the reaction, bubbling $CO_2$ into the solution (with agitation) to reach a lower pH such as pH 7.5 results in an x of ~1. That is, the product characteristics depend on the final pH at which the product resided for a sufficiently long period of time to equilibrate. Apparently, in the presence of this small quantity of ammonia and carbonate in water, the traces of copper hydroxide apparently present are readily converted to basic copper carbonate, and the resulting product is malachite. Indeed, in an alternate embodiment of the invention, which is less preferred but is still economically feasible, copper hydroxide can be formed in a manner such as is described in the prior art, and then this copper hydroxide can be partially or fully converted to basic copper carbonate, or basic copper sulfate, or basic copper acetate, by merely adding the correct anion (typically in the acid form) to the reaction composition.

In each of the previously described samples, we judged the reaction to be complete when no copper was visible. A more accurate test method was used later by adding diluted sulfuric acid to the green BCC obtained. Any copper present in BCC will not be dissolved and stay as particles and be visible. Despite the formation of $(CuCO_3)_x \cdot Cu(OH)_2$, where x was near but not quite 1, all basic copper carbonate samples made in the above examples have been as stable as regular malachite at room temperature and above (tested in oven at 55° C., where copper hydroxide would typically begin conversion to copper oxide.) The current manufacturing process for the precipitation of basic copper carbonate through copper solution and addition of soda ash would not be able to make a similar product. In the prior art process, one can precipitate basic copper carbonate at a pH of 9.5 but the product would always contain high non-washable sodium. Other manufacturing process such as through decomposition of copper amine carbonate solution always result in the theoretic malachite formula (i.e., x=1). One significant advantage of this process is we demonstrate a stable form of basic copper carbonate with the formula, $(CuCO_3)_x \cdot Cu(OH)_2$, where, x>0. Regular basic copper carbonate (x is near 1) can always be produced by the method described herein by setting the final pH to about 7 to about 7.5 in the process.

EXAMPLES 13 AND 14

These experiments were conducted in a pilot reactor of 20 gallons capacity. The reactor was constructed of 316SS with a top entering agitator. The reactor was rated at 30 psi pressure in reaction chamber and 150 psi for the steam jacket. Instead of bubbling air and $CO_2$ from the bottom of the reactor and through the composition, we added $CO_2$ and $O_2$ to the top chamber of the reactor. It is believed that with the continuous use of the agitator (a 4" diameter blade turning at 1750 rpm rate) would provide sufficient turbulence to incorporate the gases from the top of the reactor into the slurry. Since both gases are consumed in the reactions, there was no need to sparge gas continuously through the reaction composition, and therefore there was no ammonia loss over time. In each of the following experiments, into a 10-gallon water heel was added about 2.5 kg (39.4 moles) of copper powder (−325 mesh) and 1.4 kg of 30% aqueous ammonia, providing about 38 liters water and 420 grams (24.7 moles) ammonium hydroxide (as ammonia). The concentration of ammonia in the water was about 11 grams per liter (0.65 moles per liter), which is slightly higher than was initially present in Examples 1-10. For Example 13, the initial molar ratio of copper to ammonia was 1.6 as opposed to the 1.8 ratio in previous Examples 1-10, and the copper loading remained at 66 grams per liter of water, about the same ratios as in the previous Examples.

In Example 13 the reaction composition was held at pH 9 to 9.5, and the temperature was 40° to 45° C. The pH of the starting solutions was adjusted to about 9.0 by $CO_2$ addition. The reaction time was a little over 30 hours. The reaction temperature of 40° C. to 45° C. in experiment #13 was a result of the exothermal reaction and energy input by the agitator, and was not intentionally controlled. The average oxygen pressure during the reaction was about 15 psi. Occasionally, the oxygen valve was closed to allow $CO_2$ gas to enter into the reactor to bring pH manually back to slightly lower than 9. There was no loss of ammonia, as expected, during the course of the reaction since it was in an enclosed system. The mean weight particle size was 11 microns. The amount of copper in the recovered precipitate was 56.2%, and the packed bulk density was 0.73 g/cc. The reaction time took longer than expected, based on our previous experience, and it is possible that the kinetics of getting gas into the composition from the top surface instead of bubbling the gas through the composition was the cause. Also, the particle size was small, which surprisingly might be due to the small excess of ammonia and to keeping the ammonia in the composition throughout the reaction. The loss of ammonia and the resulting extended reaction time should favor growth of existing particles rather than creation of more but smaller particles. This is mere speculation, however.

In Example 14 the reaction composition was held at pH 8 to 9 or so; the pH probe was damaged after the temperature was raised with the hot steam in jacket. Therefore, more carbon dioxide may have been in the liquid. The reaction composition was otherwise the same as for Example 13. After initial charge of water, copper powders and aqueous ammonia, $CO_2$ was applied at 20 psi for 7 minutes to drop the slurry pH from 10.60 to about 9. Then, the $CO_2$ supply was turned off and the oxygen (16 psi) was applied to the headspace in the reactor. It was noted that the pH of the reaction dropped quickly to below 8 about 25 minutes after addition of copper metal and oxygenation. Then the pH increased quickly to about 8.50 within one hour after reaction started. However, the pH stayed below 8.6 until the end of reaction, again with the qualification that the pH probe output was questionable. No additional $CO_2$ was added before metal conversion finished, and the resulting product would be deficient in carbonate. The temperature was held at 75° C. for this test. Not surprisingly, the time to complete the reaction was less than 8 hours. While all copper metal was converted into a copper (II) solid material within 8 hours of reaction, the grey-colored final slurry indicated a dehydration of $CU(CO_3)_x \cdot Cu(OH)_2$ or perhaps a material where x is much less than 1. However, the color of slurry changed to the normal green exhibited by malachite after 20 psi $CO_2$ was applied to the reactor for an extended period. The pH of the slurry dropped to 7.9 after 15 hours at 20 psi $CO_2$ pressure. Also not surprisingly, the product had a mean weight particle size of only 4.5 microns, which is smaller than ideal. The amount of copper in the basic copper carbonate was 55.6% and the packed bulk density was again 0.73 g/cc.

EXAMPLE 15

The experiment was conducted similarly to experiments #4-12 except $H_2SO_4$ was used instead of $CO_2$ in the reaction. About 3 liters of DI water and 100-gram aqueous ammonia (30% $NH_3$) was charged to the reactor, and the agitation (350 rpm) was started. Then, $H_2SO_4$ solution was added to bring the pH down to about 9.0 before 200-g copper powders were charged. The concentration of ammonia in the water was just under 10 grams per liter, which is slightly lower than was initially present in Examples 1-10. For Example 15, the initial molar ratio of copper to ammonia was 1.8 as in previous Examples 1-10, and the copper loading was 66 grams per liter of water, about the same as in the previous Examples. Aeration was turned on. The pH of reaction dropped initially within five hours of aeration to a minimal value of 7.1. Then the pH increased gradually. When pH of the solution increased to higher than 8.50, $H_2SO_4$ was added to lower the pH to be slightly less than 8.50. It took about 29 hours for the reaction to convert all copper metal to blue-colored slurry. During the course of the reaction, temperature was in a range between 25 and 27° C. after pH reached the minimal. A quick analysis of blue filter cake indicated it was a mixture of copper hydroxide, copper sulfate, and perhaps basic copper sulfate. The pH of the slurry was further reduced with additional sulfuric acid. It took about 30 minutes to convert the bluish slurry to the slight green characteristic of tribasic copper sulfate, and this point was observed at a pH of about 6.8. The slurry was filtered and the filter cake was determined to be basic copper sulfate with 14.8 microns in average particle size.

The application range described were above derived from results of open top reactor near room temperature. However, a closed vessel with high pressure O2 and CO2, and more importantly a higher reaction temperature may allow a much wider range of operating window (Cu/ammonia ratio, pH . . . ) and yet to achieve affordable process economy. As a rule of thumb in thermodynamics, the reaction rate doubles for every 15-20 degrees C. temperature increase. Thus, the slower rate with some conditions at open reactors could work fine in a closed system at high O2/CO2 pressure and a higher temperature.

The invention is intended to be illustrated by, and not limited to, the limited number of Examples described here.

The invention claimed is:

1. A method of forming basic copper salt selected from basic copper carbonate, basic copper sulfate, basic copper acetate, and basic copper nitrate, the method comprising:
   contacting copper metal with an aqueous solution comprising: an amine; an acid selected from carbonic acid, sulfuric acid, acetic acid, nitric acid, or citric acid; and oxygen, under conditions where the copper metal is converted to the basic copper salt; and
   recovering the basic copper salt.

2. The method of claim 1 wherein the amine is ammonia.

3. The method of claim 2 wherein the amount of copper metal is such that there is at least one mole of copper for every two moles of ammonia.

4. The method of claim 3 wherein the amount of copper metal is such that there is at least 1.2 moles of copper metal for every mole of ammonia.

5. The method of claim 2 wherein the ammonia is present in the aqueous solution in an amount between about 6.7 g/l and about 15 g/l calculated as $NH_3$.

6. The method of claim 5 wherein the ammonia is present in the aqueous solution in an amount between about 8 g/l and about 13 g/l calculated as $NH_3$.

7. The method of claim 5 wherein the pH of the composition is between 8 and 10.

8. The method of claim 1 wherein the temperature of the composition is between 25° C. and boiling temperature.

9. The method of claim 1 wherein the basic copper salt is basic copper carbonate.

10. The method of claim 9 wherein the basic copper carbonate has the formula:
    $(CuCO_3)_x \cdot (Cu(OH)_2)_y$, where y is 1 and x is between 0.1 to less than 1.

11. The method of claim 9 wherein the basic copper carbonate has the formula:
    $(CuCO_3)_x \cdot (Cu(OH)_2)_y$, where y is 1 and x is between 0.5 to less than about 0.95.

12. The method of claim 9 wherein the basic copper carbonate has the formula:
    $(CuCO_3)_x \cdot (Cu(OH)_2)_y$, where y is 1 and x greater than 1.

13. The method of claim 1 wherein the basic copper salt is basic copper sulfate.

14. The method of claim 13 wherein the basic copper sulfate has the formula:
    $(CuSO_4)_x \cdot (Cu(OH)_2)_y$, where y is 3 and x is between 0.1 to less than 1.

15. The method of claim 13 wherein the basic copper sulfate has the formula:
    $(CuSO_4)_x \cdot (Cu(OH)_2)_y$, where y is 3 and x is greater than 1.

16. The method of claim 1 wherein the basic copper salt is basic copper nitrate.

17. The method of claim 16 wherein the basic copper nitrate has the formula:
    $(Cu(NO_3)_2)_x \cdot (Cu(OH)_2)_y$, where y is 3 and x is between 0.1 to less than 1.

18. The method of claim 16 wherein the basic copper nitrate has the formula:
    $(Cu(NO_3)_2)_x \cdot (Cu(OH)_2)_y$, where y is 3 and x is greater than 1.

19. The method of claim 1 wherein the basic copper salt is basic copper acetate.

20. The method of claim 19 wherein the basic copper acetate has the formula:
    $(Cu(CH_3COO)_2)_x \cdot (Cu(OH)_2)_y$, where y is 1 and x is between 0.1 to less than 1.

21. The method of claim 5 wherein the process is a batch or a continuous process, and wherein the aqueous solution at the beginning of the reaction further comprises between 0.1 to 15 grams of soluble copper ions per liter of soluble copper.

22. A method of forming basic copper salt selected from basic copper carbonate, basic copper sulfate, basic copper acetate, and basic copper nitrate, the method comprising:
    contacting copper (II) hydroxide with an aqueous solution comprising an amine and a sufficient amount of an acid selected from carbonic acid, sulfuric acid, acetic acid, nitric acid, or boric acid to convert at least one fourth of the copper hydroxide to the basic copper salt; under conditions where the copper hydroxide is converted to the basic copper salt; and recovering the basic copper salt.

23. The method of claim 22 wherein the amine is ammonium hydroxide.

24. The method of claim 23 wherein the copper hydroxide is formed by contacting copper metal with an oxidant and an aqueous solution comprising ammonium hydroxide under conditions that the copper metal is converted to copper hydroxide.

* * * * *

US007411080C1

(12) EX PARTE REEXAMINATION CERTIFICATE (8318th)

United States Patent
Zhao

(10) Number: US 7,411,080 C1
(45) Certificate Issued: Jun. 7, 2011

(54) DIRECT SYNTHESIS OF COPPER CARBONATE

(75) Inventor: Gang Zhao, Sumter, SC (US)

(73) Assignee: Osmose, Inc.

Reexamination Request:
No. 90/010,598, Aug. 12, 2009

Reexamination Certificate for:
Patent No.: 7,411,080
Issued: Aug. 12, 2008
Appl. No.: 11/436,528
Filed: May 19, 2006

(51) Int. Cl.
*C07F 1/08* (2006.01)
*C01B 21/06* (2006.01)
*C01B 31/30* (2006.01)

(52) U.S. Cl. ....................................... 556/114
(58) Field of Classification Search .................. None
See application file for complete search history.

(56) References Cited

U.S. PATENT DOCUMENTS 3,971,652 A 7/1976 Bryson

FOREIGN PATENT DOCUMENTS

FR 2 328 661 A1 5/1977

OTHER PUBLICATIONS

U.S. Patent and Trademark Office's English Language Translation of FR 2 328 661 published May 20, 1977.

Requestor's English Language Translation of FR 2 328 661 published May 20, 1977.

*Primary Examiner*—Carlos Lopez

(57) ABSTRACT

A basic copper salt selected from basic copper carbonate, basic copper sulfate, basic copper acetate, basic copper citrate, and basic copper nitrate is manufactured by contacting copper metal with an aqueous solution having ammonia; an acid selected from carbonic acid, sulfuric acid, acetic acid, nitric acid, or citric acid; and oxygen, under conditions where the copper metal is converted to the basic copper salt; and then recovering the basic copper salt. The most economical embodiment is where the ammonia is present in the aqueous solution is in an amount between about 6.7 g/l and about 15 g/l calculated as $NH_3$, and the pH of the composition is between 8 and 10, and the temperature of the composition is between 25° C. and 100° C. The method is particularly useful if the basic copper salt is basic copper carbonate. The basic copper carbonate produced has the formula $(CuCO_3)_x(Cu(OH_2)_y$, where y is 1 and x is between 0.1 to less than 1; or where y is 1 and x is 1, or where y is 1 and x is between 0.5 to less than about 0.95, or where y is 1 and x greater than 1.

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 5 and 22-24 are cancelled.

Claims 1, 6-7, 12 and 21 are determined to be patentable as amended.

Claims 2-4, 8-11 and 13-20, dependent on an amended claim, are determined to be patentable.

New claims 25-43 and 44 are added and determined to be patentable.

1. A method of forming basic copper salt selected from basic copper carbonate, basic copper sulfate, basic copper acetate, and basic copper nitrate, the method comprising:
   contacting copper metal with an aqueous solution comprising: an amine; an acid selected from carbonic acid, sulfuric acid, acetic acid, nitric acid, or citric acid; and oxygen, *wherein the amine is present in an amount between about 0.4 and about 0.8 mole per liter,* under conditions where the copper metal is converted to the basic copper salt; and
   recovering the basic copper salt.

6. The method of claim [5] *2* wherein the ammonia is present in the aqueous solution in an amount between about 8 g/l and about 13 g/l calculated as $NH_3$.

7. The method of claim [5] *1* wherein the pH of the composition is between 8 and 10.

12. The method of claim 9 wherein the basic copper carbonate has the formula:
   $(CuCO_3)_x \cdot (Cu(OH)_2)_y$, where y is 1 and x *is* greater than 1.

21. The method of claim [5] *1* wherein the process is a batch or a continuous process, [and] wherein the aqueous solution [at the beginning of the reaction] *before dissolving copper metal* further comprises between 0.1 to 15 grams of soluble copper ions per liter of soluble copper, *and wherein the amount of soluble copper is equal to or less than one fourth of the concentration of amine in moles per liter.*

*25. The method of claim 1 wherein the amine comprises monoethanolamine.*

*26. The method of claim 25 wherein at least more than half on a molar basis of the amine is ammonia.*

*27. The method of claim 26 wherein at least 90% of the moles of amine are ammonia.*

*28. The method of claim 9, said solution being maintained at a pH between 8.5 to 9.5.*

*29. The method of claim 1, wherein said solution has a pH equal to or greater than 8.5 and less than 11.*

*30. The method of claim 1, wherein the amine comprises ammonia present in the aqueous solution in an amount between about 9 g/l and about 12 g/l calcuated as $NH_3$.*

*31. A method of forming a copper carbonate salt having the formula $(CuCO_3)_x \cdot (Cu(OH)_2)_y$, where y is 1 and x is between 0.1 and about 0.95 or x is greater than about 1, comprising*

*contacting copper metal with an aqueous solution comprising*

*(a) ammonia in the aqueous solution in an amount between 6.7 g/l and about 15 g/l calculated as $NH_3$;*

*(b) carbonic acid; and*

*(c) oxygen; under conditions whereby the copper metal is converted to the copper carbonate salt; and*

*recovering the copper carbonate salt.*

*32. The method of claim 31, wherein the amount of copper metal is such that there is at least 1.2 moles of copper for every mole of ammonia.*

*33. The method of claim 32, said solution being maintained at a pH between about 8.5 to about 9.5.*

*34. The method of claim 32, said method being a batch method, wherein said solution has a pH equal to or greater than 8.5 and less than 11.*

*35. The method of claim 31 wherein the ammonia is present in the aqueous solution in an amount between about 8 g/l and about 13 g/l calculated as $NH_3$.*

*36. The method of claim 31 wherein the ammonia is present in the aqueous solution in an amount between about 9 g/l and about 12 g/l calculated as $NH_3$.*

*37. The method of claim 31 wherein carbonic acid is added in the form of carbon dioxide and wherein the contacting of the solution to the copper metal is at a pressure of 1.1 to 20 atmospheres.*

*38. The method of claim 31 wherein the copper carbonate salt is in the form of azurite.*

*39. The method of claim 31 wherein the copper carbonate salt has the formula: $(CuCO_3)_x \cdot (Cu(OH)_2)_y$, where y is 1 and x is between 0.5 to less than about 0.95.*

*40. The method of claim 31 wherein the contacting is performed at a temperature between about 30° C. to about 55° C.*

*41. The method of claim 31 wherein the contacting is performed at a temperature between about 35° C. to about 50° C.*

*42. The method of claim 31 wherein the contacting is performed at a temperature between about 60° C. to 100° C.*

*43. The method of claim 31 wherein the contacting is performed at a temperature between 20° C. to 30° C.*

*44. The method of claim 31 wherein the amount of copper metal is such that there is at least one mole of copper for every two moles of ammonia.*

* * * * *